United States Patent [19]
Zimmer

[11] 3,856,230
[45] Dec. 24, 1974

[54] WIRE DISPENSING CART

[76] Inventor: Edward J. Zimmer, 5383 Claridge Ln., West Bloomfield, Mich. 48033

[22] Filed: Dec. 13, 1973

[21] Appl. No.: 424,292

[52] U.S. Cl. ............................ 242/86.5 R, 242/99
[51] Int. Cl. ............................................ B65h 75/40
[58] Field of Search ............ 242/86.5 R, 86.7, 86.2, 242/99, 129

[56] References Cited
UNITED STATES PATENTS

| | | | |
|---|---|---|---|
| 2,504,046 | 4/1950 | Rabinow | 242/99 |
| 2,705,114 | 3/1955 | Worsham | 242/86.5 R |
| 3,134,555 | 5/1964 | Baker | 242/86.5 R |
| 3,520,489 | 7/1970 | Flowers | 242/86.5 R |

*Primary Examiner*—John W. Huckert
*Assistant Examiner*—Edward J. McCarthy
*Attorney, Agent, or Firm*—Whittemore, Hulbert & Belknap

[57] ABSTRACT

The cart is essentially a combination of a known type of two-wheeled hand dolly and a rigid supplemental frame superstructure, essentially of welded angle iron and bar construction, being itself welded at opposite front and rear end parts to tubular side members of the dolly and the latter's standard rigid sheet metal foot plate. Angle iron side members of the said superstructure have their side flanges disposed to extend laterally outwardly, and their 90° upright flanges carry pairs of laterally aligned, acutely angled oblique notches or slots, in which notch pairs horizontal reel spindle or axle pieces are removably received, said pieces each serving as a journal for one or more conventional side-flanged reels or spools bearing electrical wire stock. A relatively wide and flat rubber restraining or braking strap is provided adjacent each pair of said notches, the strap at its ends having hooked plastic clips which adjustably receive and snub said rubber strap ends. The clip hooks are releasably engaged about the side angle flanges of the cart's superstructure, the straps bearing frictionally against the circular reel flanges to restrain undesired reel overrun as a length of wire is drawn from the reel's cylindrical spool part. The straps may also be used to restrain from movement out of the cart superstructure notches any axle or axles not bearing a reel by simply spiraling the strap snugly about the reel spindle. By preference, the basic dolly component of the cart is provided on its tubular hand-held cross piece with a removable split cylindrical sleeve of rubber, which acts as a frictional brake bearing on the floor, when the cart is in horizontal position, to restrain possible rolling movement.

12 Claims, 3 Drawing Figures

PATENTED DEC 24 1974　　　　　　　　　　　　　　　3,856,230
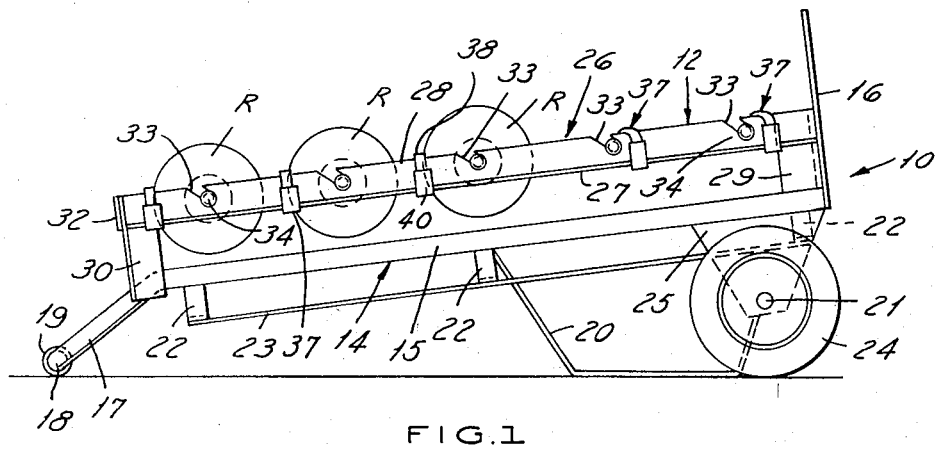
FIG.1
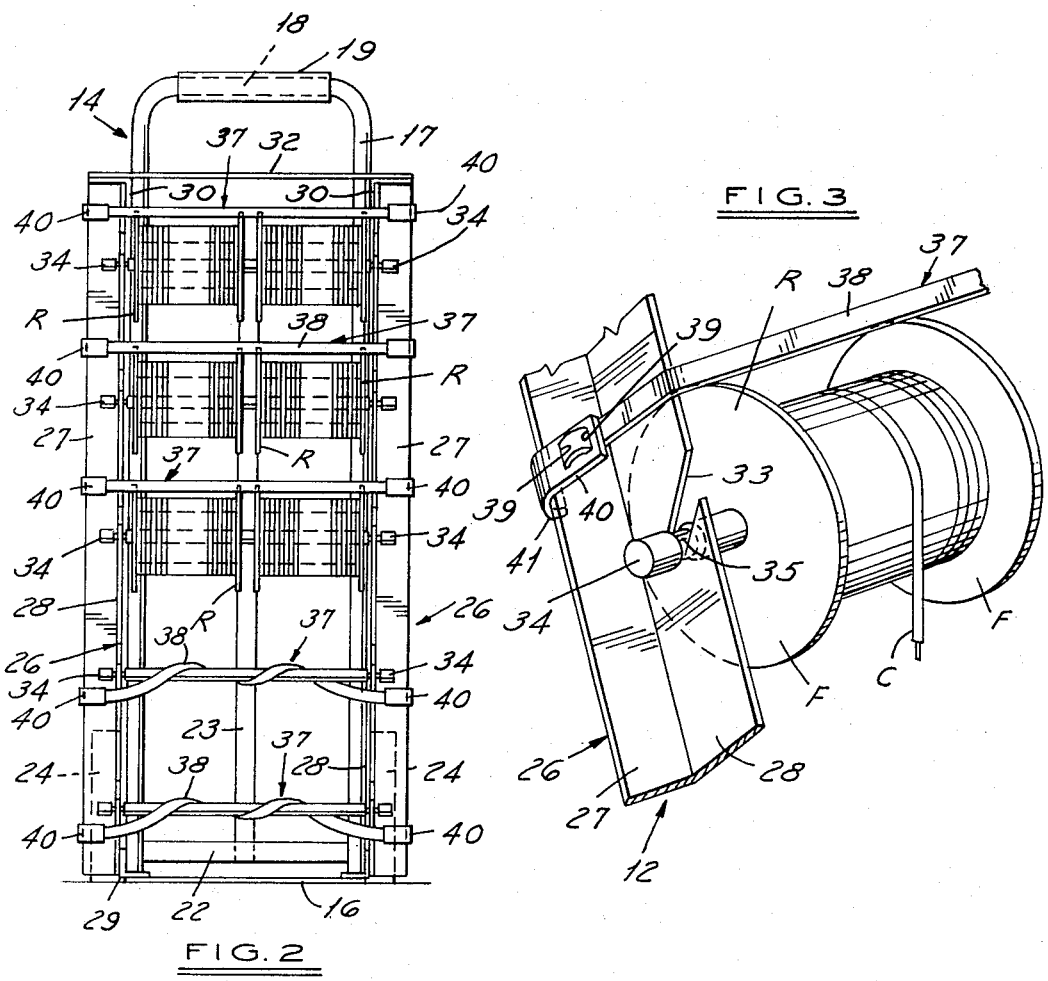
FIG.3
FIG.2 ically equal to that of a conventional hand dolly; and upon a simple removal from superstructure 12 of the reel journaling axles (to be described) the cart can be immediately used as a two-wheel hand dolly.

WIRE DISPENSING CART

BACKGROUND OF THE INVENTION

1. Field of the Invention

The improved cart is essentially intended for use in the selective dispensation from its spools or reels of a considerable number of insulated electrical conductors of different sizes, qualities, capacities, etc., in industrial, commercial and residential wiring. However, upon removal of its spool-journaling cross axles the cart is just as fully usable in all respects as a conventional hand dolly in transporting boxes, crates, and assorted other types of load.

2. Description of the Prior Art

Search has revealed the following patents as being most pertinent:

Search has revealed the following patents as being most pertinent:

| Zogg | 2,789,778 | April 23, 1957 |
| Worsham | 2,705,114 | March 29, 1955 |
| Hoover | 2,704,165 | March 15, 1955 |
| Frontz | 2,453,979 | November 16, 1948 |

SUMMARY OF THE INVENTION

The cart, as constituted in the general features mentioned in the Abstract, has a capacity to receive a large number of reels of wire of different reel or spool sizes; and as equipped with rubber restraining or braking straps, it allows wire to be fed from several reels simultaneously and expeditiously. An exchange of spools, if in order, is also a very simple operation of seconds' time. In preventing kinking, looping, and tangling of the dispensed wires the improved cart has been found to save much time on the job or location; and it is relatively compact and light of weight, although very rugged and durable under hard handling. Wires are dispensed equally efficiently under mild reel-braking action whether the cart is disposed horizontally or upright, and in the latter case the angling of the reel axle-receiving notches or slots prevents the axles from falling off the cart under a pull on the dispensed wire.

Furthermore, the cart is dimensioned laterally for unobstructed passage through standard doors, has high maneuverability in limited access areas, is easy to load on a truck for transportation to and from a job, and requires little storage space. As indicated above, it will double in all respects as a conventional hand dolly upon simply removing its spool axles, whereupon the entire load handling space of the basic tubular fitted dolly of the cart is available for the purpose in an instant's time, plus in addition a strong side restraint of the load by the angle-iron sides of the cart superstructure.

BRIEF DESCRIPTION OF THE DRAWINGS

FIG. 1 is a side elevational view of the improved wire dispensing cart in a horizontal rest position;

FIG. 2 is a front elevational view of the cart in its upright rest position, both FIGS. 1 and 2 showing a number of wire dispensing reels as frictionally restrained or braked against rotation by rubber strap members, with other journaling axles or spindles which lack reels being retained in place by straps; and FIG. 3 is a fragmentary perspective view in larger scale, further depicting the frictional braking action of a strap on reel flanges, with the axis of the reel itself restrained against excess endwise movement in a slot in the cart's superstructure.

DESCRIPTION OF A PREFERRED EMBODIMENT

The cart of the invention, generally designated by the reference numeral 10, exists as a superstructure unit 12 rigidly mounted atop a conventional manually operated two-wheel dolly, which dolly is generally designated by the reference numeral 14. It comprises a pair of elongated tubular side frame members 15 which at one end (right-hand and bottom as viewed in FIGS. 1 and 2 respectively) carry a conventional 90° load supporting foot plate 16 of rigid sheet steel, this plate having a welded connection to the ends of the two side frame tubes 15.

Toward the opposite ends thereof the dolly side members 15 are obtusely angled at 17, being there integrally connected by a cross piece 18 constituting a dolly handle; and pursuant to the present improvement said handle is equipped with a removable split tubular sleeve 19 of rubber in a substantial length along the cross part 18. This sleeve serves as a floor-engaging and protecting bumper, also acting to restrain the cart 10 as a whole against movement in its horizontal rest position of FIG. 1, as when a length or lengths of wire are being stripped from one or more of the conventional wire spools or reels R sustained by the cart's superstructure 12.

The basic dolly 14 is conventionally equipped with a pair of rigid supporting leg straps 20 of a generally truncated V outline, which straps are rigidly welded to the fixed forward wheel axle rod 21 of the dolly and to the latter's tubular side members 15, in this case adjacent a middle one of three conventional cross cradle straps 22 of the dolly. likewise, conventionally, Likewise, elongated rigid bracing strap 23 is welded beneath the midpoints of the several cradle parts 22. Standard rubber-tired and ball bearing-journaled wheels 24 are mounted to trolley axle 21, which is carried by rigid truncated V-shaped brackets 25 welded at their tops to the respective tubular side pieces 15 of the dolly.

Now in reference to the improved superstructure unit 12 of cart 10, it includes a pair of front-to-rear elongated side members 26 to removably receive and support the reels R at their respective journaling axles, in a manner to be described. Said members 26 are rigid steel angle irons disposed with lateral flanges 27 thereof extending oppositely outwardly and with their 90° vertical flanges 28 parallel to one another. At the forward end of the side angle pieces 26 their flanges 28 are each welded to a relatively short upright iron length 29, which lengths are in turn welded to the sides of the foot plate 16 of dolly 14, also to the forward ends of the latter's side members 15 at the bottoms of the lengths.

At the opposite or handle end zone of the cart the vertical side angle iron flanges 28 also carry short welded upright angle iron lengths 30, which depend beneath the side angles 26 proper and have a further welded connection to the outer sides of the tubular frame members 15 of dolly 14, adjacent the angled offsets 17 of said members. The cart superstructure 14 is completed by a rigid cross strap 32 welded at its ends to angle iron lengths 30 and to dolly side members 15. Accordingly, a reel supporting superstructure is afforded which is of a rigidity at least as, if not more than, that of the basic dolly unit 14 itself, and which is accordingly capable of sustaining any load that said unit will sustain.

Further pursuant to the invention, the 90° upright flanges 28 of the superstructure angle irons 26 are slotted obliquely inwardly from their edges to afford a number of pairs of transversely aligned and sharply angled notches 33, each pair sized to freely and removably receive the journaling cross spindle or axle 34 for one or more wire spools or reels R. As appears in FIG. 3, these cylindrical section spindles are turned adjacent their opposite ends to provide reduced diameter circular reliefs or grooves 35 which seat in the slots or notches 33. They thus restrain the respective reel journals 34 from substantial endwise displacement relative to the angle members 26.

Further in accordance with the invention, it contemplates the provision of a plurality of reasonably elastic frictional restraining strap devices, generally designated 37, equal in number to the registered pairs of reel journaling notches 33. As best shown in FIG. 3, each such device comprises an elongated, flat and relatively wide strap 38 of natural or synthetic rubber, which adjacent each of its opposite ends has an adjustable but frictionally snubbed connection as woven through a pair of slots 39 in a rigid plastic hooked anchoring clip piece 40. The hook extremity 41 of each such clip 40 takes around the laterally extending flange 27 of each of the angle iron side pieces 26 of superstructure 12; and each strap as thus removably anchored engages over the other upright flange 28 of such side member.

FIG. 3 shows the point of application of each restraining unit 37 as being, in relation to a reel R, such that its strap 38 bears frictionally against one or both of the usual circular reel or spool disc flanges F, thus preventing over-reeling, coasting and tangling of an electrical cord C as it is unwound from the reel. Further functions of the strap units 37 are to prevent possible shift of the cord C from the reel above said flange F of the latter, and to prevent accidental displacement of non-reel bearing axles or spindles 34 in position in their open-ended notches.

To this latter end, FIG. 2 shows two of the strap units 37 as being transversely spiraled over and across a substantial portion of the axial spindle length, thus serving as a restraint resiliently biasing the unused spindles into their seats in the side member notches 33.

It is evident that the dolly and superstructure combination shown as constituting the dispensing cart 10 enables reels R of different flange diameter to be handled, in its arrangement of plural sets of journaling recesses 33, either in uniform or random sizes, and that by the same token reels or spools of differing axial lengths may be accommodated due to the unobstructed and substantial axial length of the journaling spindles 34. The economy and convenience of the retaining and restraining strap devices, with releasable hook anchors to the superstructure angle irons, are self-evident.

What is claimed is:

1. A cart for dispensing wire or the like products, comprising the combination of a wheeled dolly unit usable as such for transporting loads, and a rigid superstructure unit fixedly mounted on said dolly unit to convert the latter for the dispensing of such products, said superstructure unit comprising a pair of elongated laterally spaced side frame members having a plurality of transversely spaced and aligned pairs of openings to removably receive spindles of end-flanged product reels, and a plurality of like elongated strap devices extending between said laterally spaced side frame members, each of said strap devices being provided at opposite ends thereof with means for releasably anchoring the strap device to said frame members, with said strap devices in frictional restraining engagement with either a reel and flange or with a spindle for a reel.

2. The dispensing cart of claim 1, in which the pairs of openings of said side frame members are slots opening through margins of the members.

3. The dispensing cart of claim 1, in which the pairs of openings of said side frame members are slots opening at an oblique angle through margins of the members.

4. The dispensing cart of claim 1, in which said side frame members are angle irons of 90° cross-section each presenting a side flange projecting laterally outwardly of the member.

5. The dispensing cart of claim 3, in which said side frame members are angle irons of 90° cross-section each presenting a side flange projecting laterally outwardly of the member.

6. The dispensing cart of claim 1, in which said strap devices each comprise an elongated elastic length having selective frictional braking engagement with a said reel end flange or a said reel spindle.

7. The dispensing cart of claim 2, in which said 2 strap devices each comprise an elongated elastic length having selective frictional braking engagement with a said reel end flange or a said reel spindle.

8. The dispensing cart of claim 3, in which said strap devices each comprise an elongated elastic length having selective frictional braking engagement with a said reel end flange or a said reel spindle.

9. The dispensing cart of claim 4, in which said strap devices each comprise an elongated elastic length having selective frictional braking engagement with a said reel end flange or a said reel spindle.

10. The dispensing cart of claim 1, in which the releasable anchoring means for the strap device comprises a clip at an end thereof, said clip having releasable anchoring engagement with a side frame member of the superstructure unit.

11. The dispensing cart of claim 5, in which the releasable anchoring means for the strap device comprises a clip at an end thereof, said clip having releasable anchoring engagement with and about a side flange of a side frame member of the superstructure unit.

12. The dispensing cart of claim 9, in which the releasable anchoring means for the strap device comprises a clip at an end of said elastic length thereof, said clip being provided with a hook portion for releasable anchoring engagement with and about a side flange of a side frame member of the superstructure unit.

* * * * *